(12) United States Patent
Hsieh (10) Patent No.: US 8,572,953 B2
(45) Date of Patent: Nov. 5, 2013

(54) VEHICLE EXHAUST WASTE HEAT UTILIZING SYSTEM HAVING A HEATING PIPE MECHANISM

(76) Inventor: Chin-Chih Hsieh, Tianwei Township (TW)

( * ) Notice: Subject to any disclaimer, the term of this patent is extended or adjusted under 35 U.S.C. 154(b) by 300 days.

(21) Appl. No.: 13/065,560

(22) Filed: Mar. 22, 2011

(65) Prior Publication Data

US 2011/0232272 A1   Sep. 29, 2011

(30) Foreign Application Priority Data

Mar. 25, 2010   (TW) .............................. 99108877 A
Oct. 18, 2010   (TW) .............................. 99135427 A (51) Int. Cl.
*F01N 3/02*   (2006.01)

(52) U.S. Cl.
USPC .................. 60/320; 60/298; 60/321; 165/51

(58) Field of Classification Search
USPC ................. 60/298, 320, 321, 299; 165/51
See application file for complete search history.

(56) References Cited

U.S. PATENT DOCUMENTS

| | | | | |
|---|---|---|---|---|
| 4,516,403 A | * | 5/1985 | Tanaka | 60/667 |
| 5,398,747 A | * | 3/1995 | Miaoulis | 165/41 |
| 5,653,106 A | * | 8/1997 | Katashiba et al. | 60/300 |
| 6,202,782 B1 | * | 3/2001 | Hatanaka | 180/301 |
| 6,324,849 B1 | * | 12/2001 | Togawa et al. | 60/616 |
| 6,464,854 B2 | * | 10/2002 | Andrews et al. | 205/628 |
| 6,877,323 B2 | * | 4/2005 | Dewis | 60/784 |
| 6,990,805 B2 | * | 1/2006 | Ohta et al. | 60/320 |

FOREIGN PATENT DOCUMENTS

FR    2921689 A1    4/2009
JP    58-191640 A    11/1983

* cited by examiner

*Primary Examiner* — Binh Q Tran
(74) *Attorney, Agent, or Firm* — Kilpatrick Townsend & Stockton LLP (57) ABSTRACT

A vehicle exhaust waste heat utilizing system includes a heating pipe mechanism heated by an exhaust device to boil raw water, a raw-water containing mechanism, a boiled-water conveying mechanism, and a boiled-water processing mechanism. The raw-water containing mechanism supplies raw water into the heating pipe mechanism. The boiled-water conveying mechanism conveys boiled water flowing from the heating pipe mechanism. The boiled-water processing mechanism receives and stores the boiled water flowing from the boiled-water conveying mechanism.

15 Claims, 8 Drawing Sheets

VEHICLE EXHAUST WASTE HEAT UTILIZING SYSTEM HAVING A HEATING PIPE MECHANISM

CROSS-REFERENCE TO RELATED APPLICATION

This application claims priority to Taiwanese Application No. 099108877, filed Mar. 25, 2010 and Taiwanese Application No. 099135427, filed Oct. 18, 2010, the disclosures of which are incorporated herein by reference.

BACKGROUND OF THE INVENTION

1. Field of the Invention

This invention relates to a waste heat utilizing system having a heating pipe mechanism, and more particularly to a vehicle exhaust waste heat utilizing system having a heating pipe for conveying waste exhaust gases from a vehicle.

2. Description of the Related Art

In a vehicle engine power system utilizing gasoline and diesel as primary fuels, a catalytic converter is disposed for converting incompletely combusted gases or poison materials into harmless or less harmful ones for environmental protection purposes. However, waste heat generated from the catalytic converter has a relatively high temperature to thereby become a cause of greenhouse effect. To solve the waste heat problem, a portion of the waste heat generated from a catalytic converter is driven by steam to return to the engine power system, or is converted into electric energy, such that the electric energy is transmitted to the electricity system of the vehicle. The energy-converting efficiency of the above-mentioned process (i.e., a process for converting waste heat of exhaust gases into electric energy or mechanical energy) is relatively low. Furthermore, related equipment required for energy-converting process is complicated in structure, and has a relatively high cost. As such, numerous components are mounted to the vehicle for generating only a small amount of electricity or power, which does not meet the requirement for environmental protection.

Although someone has tried to utilize waste heat of vehicle exhaust gases to process water, the water processing equipment is driven by the electricity system of the vehicle, and is controlled by additional electric equipment, thereby resulting in further electrical power consumption of the vehicle and, thus, further fuel consumption for supplementing electricity to thereby also involve a violation of environmental protection. Hence, it is desirable to provide an environmental protective exhaust waste heat utilizing system.

SUMMARY OF THE INVENTION

An object of this invention is to provide a vehicle exhaust waste heat utilizing system that utilizes waste heat of vehicle exhaust gases to process water.

According to this invention, there is provided an exhaust waste heat utilizing system for a vehicle, the vehicle including a vehicle body, and an exhausting device mounted on the vehicle body, the exhaust waste heat utilizing system comprising:

a raw-water containing mechanism adapted to be mounted on the vehicle body and adapted to contain raw water;

a heating pipe mechanism in fluid connection with the raw-water containing mechanism and adapted to be mounted on the exhausting device, the heating pipe mechanism having a heating compartment in fluid communication with the raw-water containing mechanism such that the raw-water containing mechanism supplies the raw water into the heating compartment, the heating compartment being adapted to be heated by the exhausting device to boil the raw water to thereby form boiled water;

a boiled-water conveying mechanism in fluid connection with the heating pipe mechanism for receiving and conveying the boiled water flowing from the heating pipe mechanism; and a boiled-water processing mechanism adapted to be mounted on the vehicle body and including a boiled-water storing box in fluid connection with the boiled-water conveying mechanism for receiving and storing the boiled water flowing from the boiled-water conveying mechanism, and a boiled-water passable one-way valve connected between and in fluid communication with the boiled-water storing box and the raw-water containing mechanism for limiting flow of the boiled from the boiled-water storing box into the raw-water containing mechanism.

BRIEF DESCRIPTION OF THE DRAWINGS

These and other features and advantages of this invention will become apparent in the following detailed description of two preferred embodiments of this invention, with reference to the accompanying drawings, in which.

DETAILED DESCRIPTION OF THE PREFERRED EMBODIMENTS

Before the present invention is described in greater detail in connection with the preferred embodiments, it should be noted that similar elements and structures are designated by like reference numerals throughout the entire disclosure.

Figure 1:
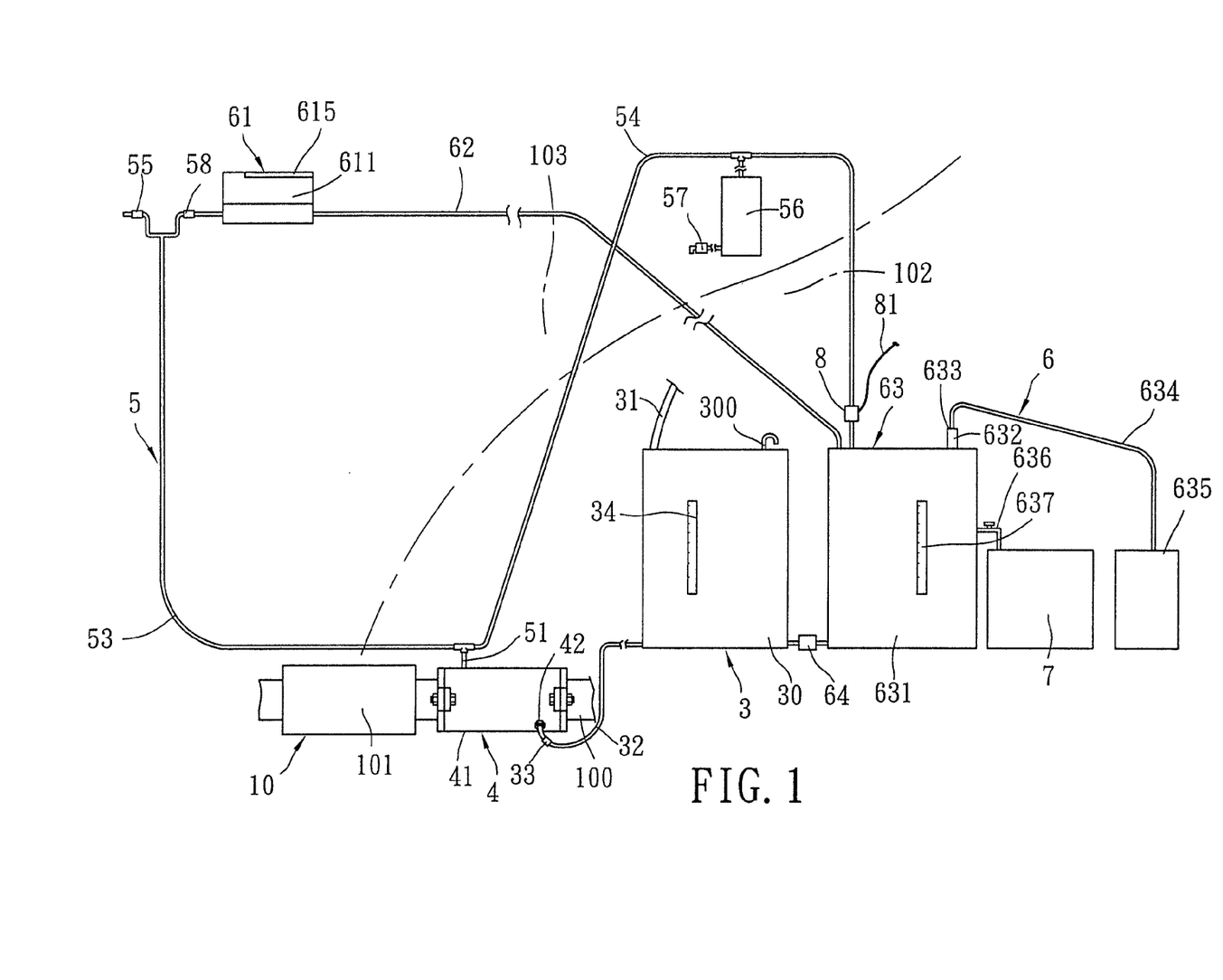
FIG. 1 is a schematic view of the first preferred embodiment of a vehicle exhaust waste heat utilizing system according to this invention.
Figure 2:
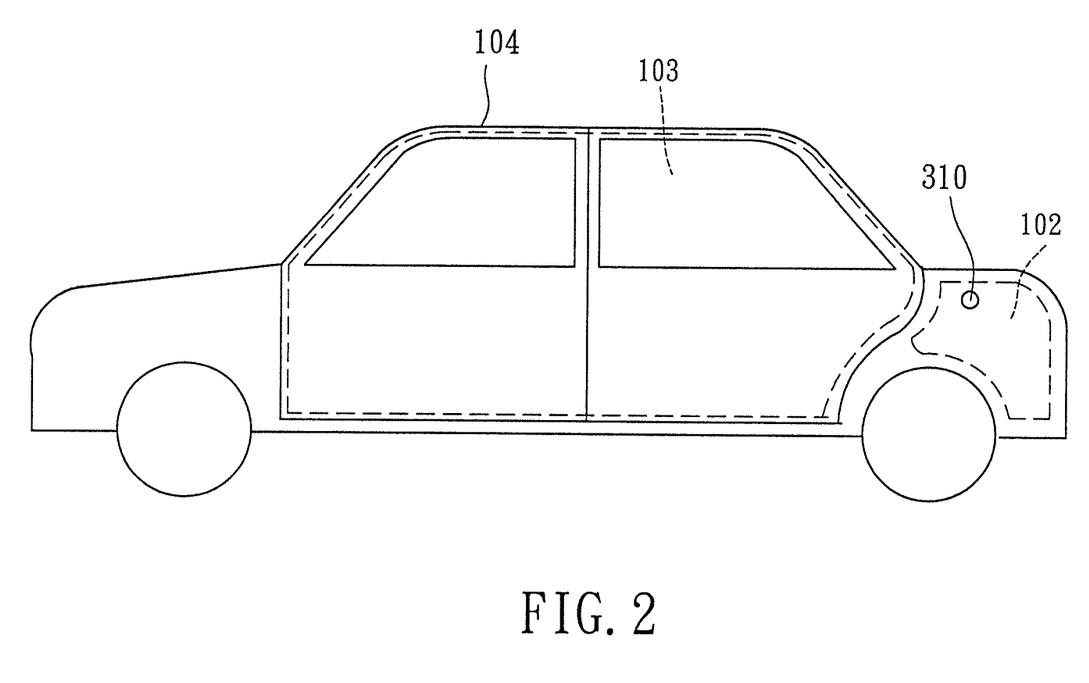
FIG. 2 is a schematic side view of a vehicle incorporating the first preferred embodiment.

Referring to FIGS. 1 and 2, the first preferred embodiment of a vehicle exhaust waste heat utilizing system according to this invention is incorporated in a vehicle. The vehicle includes a vehicle body 104, and an exhausting device 10 mounted on a bottom portion of the vehicle body 104. The exhausting device 10 includes a catalytic converter 101 and an exhaust pipe 100. The vehicle body 104 has a front cabin area 103 for sitting of passengers, and a storage compartment area 102 for storing articles. In the case of a car, the storage compartment area 102 is a rear cabin not designed for sitting of passengers. In the case of a tour bus, the storage compartment area 102 is any area not designed for sitting of passengers.

The vehicle exhaust waste heat utilizing system includes a raw-water containing mechanism 3, a heating pipe mechanism 4 connected between and in fluid communication with the catalytic converter 101 and the exhaust pipe 100, a boiled-water conveying mechanism 5 in fluid connection with the heating pipe mechanism 4, a boiled-water processing mechanism 6 disposed on the vehicle body 104 and connected between and in fluid communication with the boiled-water conveying mechanism 5 and the raw-water containing mechanism 3, a removable boiled-water containing box 7 connected removably to and in fluid communication with the boiled-water processing mechanism 6 and disposed in the storage compartment area 102, and a thermoelectric chip module 8 mounted to the boiled-water conveying mechanism 5.

The raw-water containing mechanism 3 includes: a hollow raw water box 30 for containing raw water; a water-supplementing pipe 31 in fluid connection with atop end of the raw water box 30 and having a water-supplementing port 310 formed in an outer surface of the vehicle body 104; a water supply pipe 32 connected between and in fluid communication with a bottom end portion of the raw water box 30 and the heating pipe mechanism 4; a raw-water passable one-way valve 33 mounted to the water supply pipe 32 for limiting flow of water toward the heating pipe mechanism 4; and a water level indicator 34 disposed on an outer surface of the raw water box 30 for indicating the level of the water contained within the raw water box 30. The raw water box 30 is provided with a vent pipe 300 in fluid communication with the surroundings. Alternatively, the water-supplementing port 310 may be formed directly in the raw water box 30.

Figure 3:
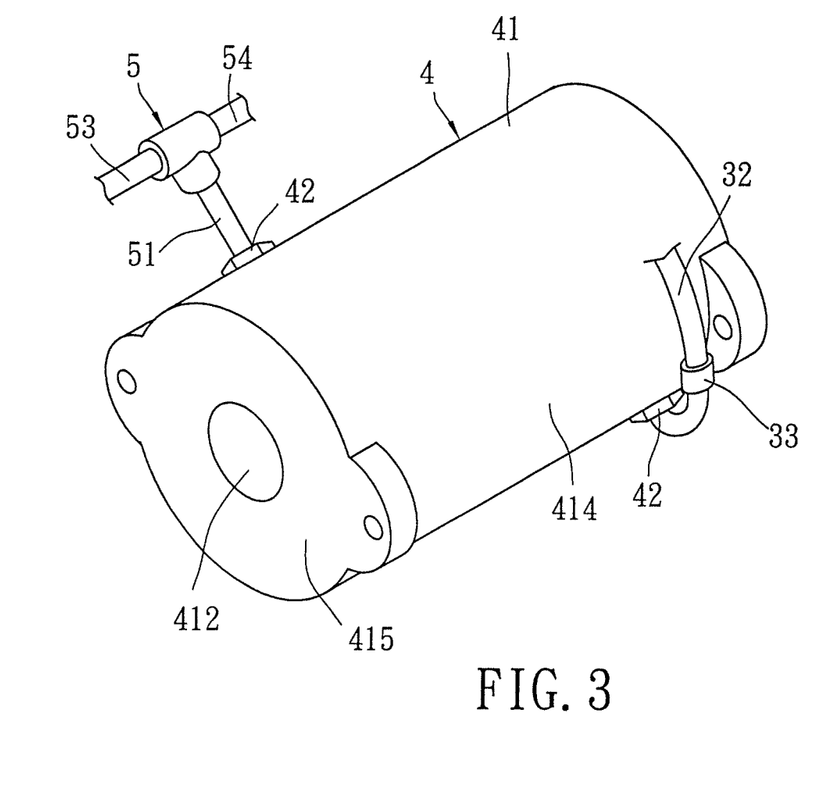
FIG. 3 is a perspective view of a heating pipe mechanism of the first preferred embodiment.
Figure 4:
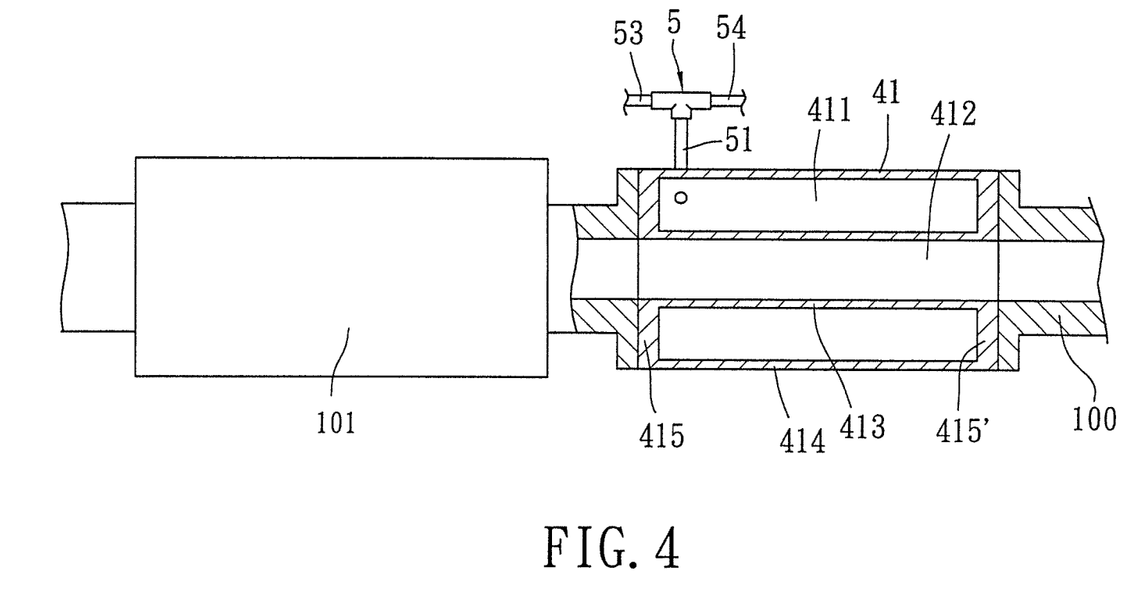
FIG. 4 is a sectional side view of the heating pipe mechanism of the first preferred embodiment, illustrated that the heating pipe mechanism is connected between an exhaust pipe and a catalytic converter.

With further reference to FIGS. 3 and 4, the heating pipe mechanism 4 is connected fixedly between and in fluid communication with the water supply pipe 32 and the boiled-water conveying mechanism 5. The heating pipe mechanism 4 includes a heating pipe 41 disposed between and in fluid connection with the catalytic converter 101 and the exhaust pipe 100, and front and rear fittings 42 in fluid connection with the boiled-water conveying mechanism 5 and the water supply pipe 32, respectively. The heating pipe 41 includes a pair of inner and outer annular walls 413, 414 radially spaced apart from each other, a front connecting end wall 415 connected between front ends of the inner and outer annular walls 413, 914, and a rear connecting end wall 415' connected between rear ends of the inner and outer annular walls 413, 414. The inner and outer annular walls 413, 414 cooperate with the front and rear connecting end walls 415, 415' to define an exhaust passage 412 formed through the heating pipe mechanism 4 in a front-to-rear direction for conveying exhaust gases produced from the vehicle, and a heating compartment 411 disposed around and spaced apart from the exhaust passage 412. The front and rear fittings 42 are disposed respectively on a top end portion of a front end portion of the outer annular wall 414 and a bottom end portion of a rear end portion of the outer annular wall 414. The water supply pipe 32 is in fluid connection with the rear fitting 42. The boiled-water conveying mechanism 5 is in fluid connection with the front fitting 92.

The heating pipe mechanism 4 has two ends connected respectively and fixedly to the catalytic converter 101 and the exhaust pipe 100, so as to allow waste gases discharged from the catalytic converter 101 to flow into the exhaust pipe 100 through the exhaust passage 412. Raw water flowing from the raw water containing mechanism 3 is received within the heating compartment 411. Since the heating pipe mechanism 4 is heated by the waste gases (having a high temperature of more than 200° C.) discharged from the catalytic converter 101, the raw water received within the heating compartment 411 is heated to form boiled water, which is limited by the raw-water passable one-way valve 33 to flow into the boiled-water processing mechanism 6 through the boiled-water conveying mechanism 5.

Since the storage compartment area 102 is above the exhaust pipe 100 and the catalytic converter 101, the water level of the raw water box 30 is above the heating pipe mechanism 4. As such, the boiled water flows from the heating compartment 411 into the boiled-water conveying mechanism 5. Hence, raw water flows from the raw water box 30 into the heating compartment 411 until the heating compartment 411 is filled with water.

The boiled-water conveying mechanism 5 includes a communicating pipe 51 having a lower end in fluid connection with the front fitting 44, a pair of first and second boiled-water pipes 53, 54 connected respectively to and in fluid communication with two opposite sides of an upper end of the communicating pipe 51, a first water faucet 55 in fluid connection with a front end of the first boiled-water pipe 53, a passenger-accessible water barrel 56 in fluid connection with the second boiled-water pipe 54, a second water faucet 57 mounted to and in fluid communication with the passenger-accessible water barrel 56, and a heating valve 58 connected between and in fluid communication with the front end of the first boiled-water pipe 53 and the boiled-water processing mechanism 6.

Rear ends of the first and second boiled-water pipes 53, 54 are connected to the boiled-water processing mechanism 6. A front end portion (i.e., upper end portion) of the first boiled-water pipe 53 is transparent, such that the water level of the first boiled-water pipe 53 is visible. The first water faucet 55 is adjacent to the driver seat of the vehicle, so that the driver can conveniently access to and open the first water faucet 55. The heating valve 58 is disposed between the first boiled-water pipe 53 and the boiled-water processing mechanism 6, and is normally in a closed state. Upon opening the heating valve 58, high-temperature boiled water flows from the first boiled-water pipe 53 into the boiled-water processing mechanism 6.

The passenger-accessible water barrel 56 is disposed in the front cabin area 103, and is adjacent to the rear passenger seat for receiving and storing boiled water flowing from the second boiled-water pipe 54. The second water faucet 57 is operable to allow boiled water to flow from the passenger-accessible water barrel 56.

The thermoelectric chip module 8 is sleeved removably on a rear end portion of the second boiled-water pipe 54, and is heated by the high-temperature boiled water flowing within the second boiled-water pipe 54 to thereby generate and output electricity to an electronic device in the vehicle, such as mobile phone or multimedia player, via a transmission cable 81 for electricity charging. Since the thermoelectric chip module 8 is well known in the art, further description thereof will be omitted herein.

Figure 5:
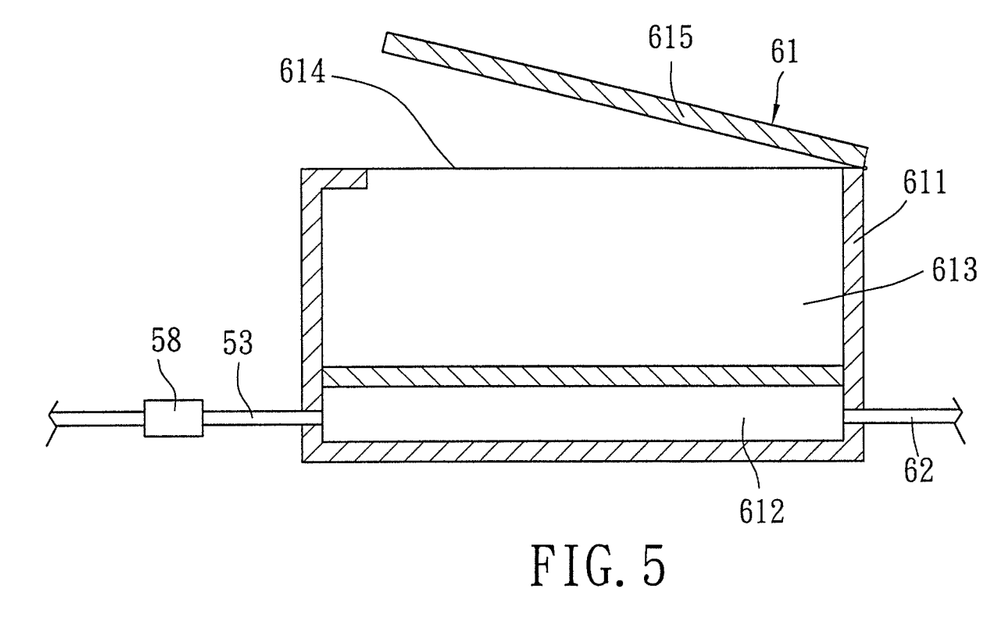
FIG. 5 is a sectional side view of a heating case of the first preferred embodiment.

With further reference to FIG. 5, the boiled-water processing mechanism 6 is mounted on the vehicle body 104, and is located in the front cabin area 103 and the storage compartment area 102. The boiled-water processing mechanism 6 includes a hollow heating case 61 mounted in the front cabin area 103 and in fluid communication with the front end portion of the first boiled-water pipe 53, a water conduit 62 in fluid connection with the heating case 61 and extending rearwardly into the storage compartment area 102, a boiled-water storing box 63 in fluid connection with rear ends of the water conduit 62 and the second boiled-water pipe 53 and located in the storage compartment area 102, and a boiled-water passable one-way valve 64 connected between and in fluid communication with the boiled-water storing box 63 and the raw water box 30.

The heating case 61 includes a hollow case body 611 mounted on the vehicle body 104, and a cover body 615 mounted on the case body 611. The case body 611 has a heating space 612 in fluid connection with the first boiled-water pipe 53 and the water conduit 62, and a temperature conservation space 613 spaced apart from and disposed above the heating space 612 and having an upper end opening 614. When the heating valve 58 is opened, boiled water flows from the first boiled-water pipe 53 into the heating space 612. In this embodiment, the heating case 61 is made of a heat-insulating material. In this embodiment, the cover body 615 is disposed pivotally on the case body 611.

The boiled-water storing box 63 includes a main box body 631, a pressure relief valve 632 mounted on a top end of the main box body 631, a condensing pipe 634 having a front end in fluid connection with the pressure relief valve 632, a water-collecting box body 635 in fluid connection with a rear end of the condensing pipe 634, a switch 636 mounted on the main box body 631, and a water-level indicator 637 mounted on a side surface of the main box body 631 for indicating the water level of the main box body 631. The pressure relief valve 632 has a pressure-releasing end 633 directing outwardly.

Since the temperature of boiled water flowing from the water conduit 62 and the second boiled-water pipe 54 into the main box body 631 are higher than room temperature, and is not less than 50° C., flow of boiled water from the water conduit 62 and the second boiled-water pipe 54 into the main box body 631 results in an increase, in the air pressure in the main box body 631. When the air pressure in the main box body 631 is increased to a predetermined pressure value, the pressure relief valve 632 is opened for pressure relief, so as to avoid excessive pressure in the main box body 631. Steam flowing from the pressure relief valve 632 is condensed to form water within the condensing pipe 634. The water drops from the condensing pipe 634 into the water collecting box body 635 for reuse.

The switch 636 is configured as a quick coupler, and permits the removable boiled-water containing box 7 to be connected removably thereto. Upon opening of the switch 636, boiled water flows from the main box body 631 into the removable boiled-water containing box 7. When the removable boiled-water containing box 7 is removed from the switch 636, it can be moved to other place.

Due to the presence of the boiled-water passable one-way valve 64, water is limited to flow from the main box body 631 into the raw water box 30. As such, when the water level of the main box body 631 is above the raw water box 30, or when the water pressure in the main box body 631 is higher than that in the raw water box 30, water flows from the main box body 631 into the raw water box 30 until the main box body 631 and the raw water box 30 have the same water level or the same water pressure, so as to achieve recycle use of water.

With particular reference to FIGS. 1, 4, and 5, during use of the vehicle exhaust waste heat utilizing system of this invention, the raw water box 30 is filled with raw water to be processed, such as tap water or mountain spring water. During starting or moving of the vehicle, the raw water flows into the heating compartment 411 of the heating pipe mechanism 4 for boiling. Subsequently, the boiled water flows into the communicating pipe 51, and then is conveyed by the boiled-water conveying mechanism 5 into the boiled-water processing mechanism 6.

At this time, when the driver needs to utilize the heating case 61 for heating or temperature conservation of food, the food is placed into the heating space 612 in the heating case 61, and the heating valve 58 is opened. Hence, high-temperature boiled water flows from the first boiled-water pipe 53 into the heating space 612 and then the water conduit 62. Flow of the boiled water through the heating space 612 results in an increase in the temperature of the heating space 613 to thereby achieve the heating or temperature conservation function. After the boiled water passes through the heating case 61, it is guided into the main box body 631 by the water conduit 62 for storage. As soon as the heating case 61 is no longer used, the heating valve 58 is closed.

Whether the heating valve 58 is opened or not, when the driver or the passenger sitting on the front seat desires to drink the high-temperature boiled water, it is only necessary to open the first faucet 55, thereby resulting in convenience during use. Furthermore, the front end portion of the first boiled-water pipe 53 is transparent, as described above, so as to allow the user to easily realize whether or not there is water within the first boiled-water pipe 53, thereby further resulting in convenience during use.

When the boiled water flows into the communicating pipe 51 from the heating pipe mechanism 4, a portion thereof flows into the passenger-accessible water barrel 56 and the main box body 631 via the second boiled-water pipe 54.

At this time, the passenger sitting on the rear seat can access to the boiled water in the passenger-accessible water barrel 56 by operating the second faucet 57.

The second boiled-water pipe 54 is in a normally opened state. The first boiled-water pipe 53 and the water conduit 62 are in a normally closed state.

The user can realize water consumption amount from the water-level indicator 34, 637 of the raw-water containing mechanism 3 and the boiled-water storing box 63, so as to supplement raw water into the raw water box 30 via the water-supplementing pipe 31 in time. The boiled-water passable one-way valve 64 is disposed to prevent flow of water from the raw water box 30 into the boiled-water storing box 63 even when the water level of the raw water box 30 is above that of the boiled-water storing box 63. As a result, the boiled water in the boiled-water storing box 63 is prevented from being contaminated by any raw water.

When the water level of the main box body 631 is above the switch 636, and when it is desired to take boiled water out of the vehicle for use, the switch 636 is first opened to allow for flow of the boiled water from the main box body 631 into the removable boiled-water containing box 7. Next, the removable boiled-water containing box 7 is removed from the switch 636.

Since the heating pipe mechanism 4 is directly connected to the catalytic converter 101 and the exhaust pipe 100, it is convenient to install, and has a good heat exchange efficiency. Furthermore, either the catalytic converter 101 or the exhaust pipe 100 can be removed with relative ease for repair or replacement.

In this embodiment, the boiled-water conveying mechanism 5 includes only one passenger-accessible water barrel 56. However, in an application to an ordinary bus or a tour bus having a plurality of independent passenger seats, each of the seats can be mounted with a passenger-accessible water barrel 56, such that each passenger can conveniently and rapidly take boiled water from the corresponding passenger-accessible water barrel 56.

Figure 6:
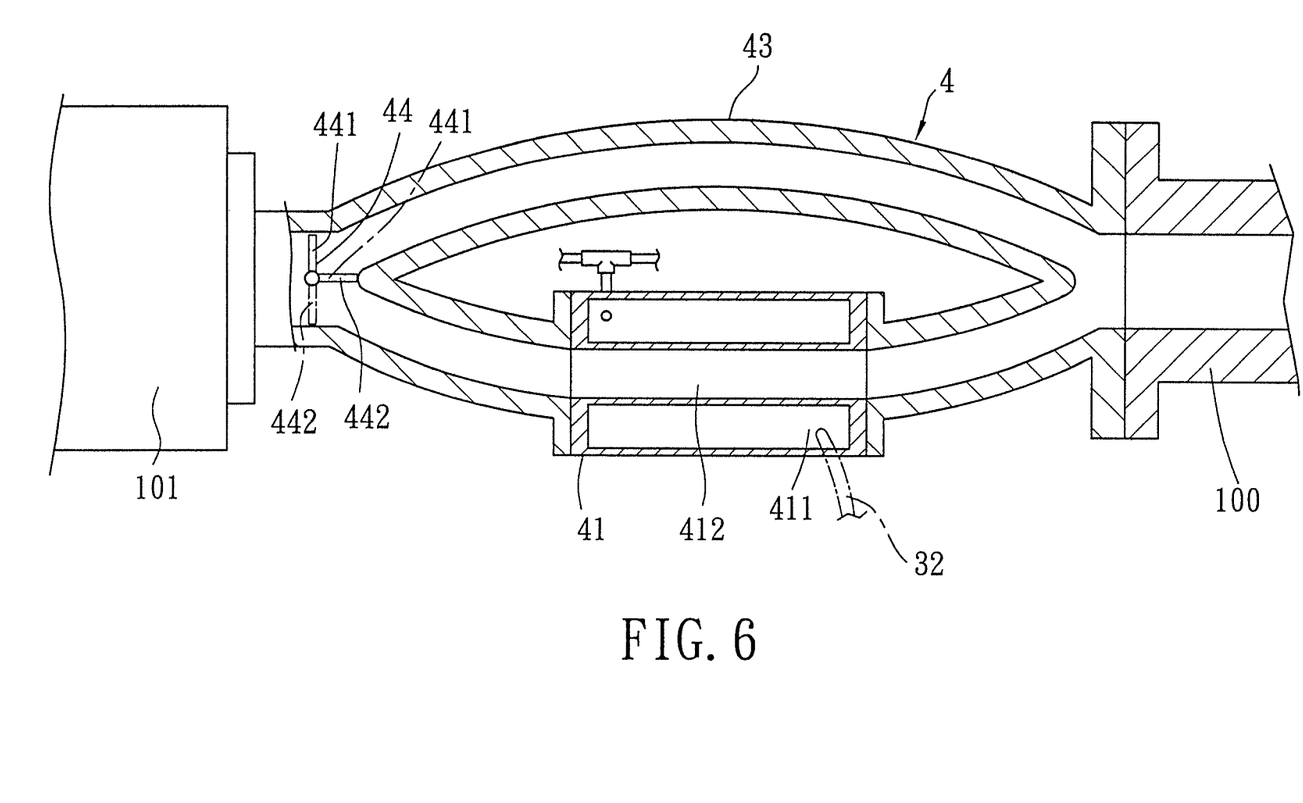
FIG. 6 is a sectional side view of a heating pipe mechanism of the second preferred embodiment of a vehicle exhaust waste heat utilizing system according to this invention.

FIG. 6 shows a modified heating pipe mechanism 4 of the second preferred embodiment of a vehicle exhaust waste heat utilizing system according to this invention. The modified heating pipe mechanism 4 further includes a bypass pipe 43 and a control valve 44. The bypass pipe 43 has two ends in fluid connection with two ends of the heating pipe 41, and bypasses the heating compartment 411. The control valve 44 is disposed among the catalytic converter 101, the heating pipe 41, and the bypass pipe 43, and has first and second valve portions 441, 442 perpendicular to each other. The control valve 44 is operable to pivot between a first valve position shown by the solid lines, where a proximate end of the bypass pipe 43 proximate to the catalytic converter 101 is closed by the control valve 44 and where a proximate end of the heating pipe 41 proximate to the catalytic converter 101 is open, and a second valve position shown by the phantom lines, where the proximate end of the heating pipe 41 is closed by the control valve 44 and where the proximate end of the bypass pipe 43 is open.

A driving switch (not shown) for driving the control valve 44 can be disposed in proximity to a driver seat, e.g., on a gage panel or a side of the driver seat, so as to result in convenience during use. The driving switch may be a manual switch or an electric switch. When it is desired to utilize the heating pipe 41 to boil water, the control valve 44 is pivoted to the first valve position to limit exhaust gases to flow from the catalytic converter 101 into the exhaust pipe 100 through the heating pipe 41. When boiling of water is not required, the control valve 44 is pivoted to the second valve position to limit exhaust gases to flow from the catalytic converter 101 into the exhaust pipe 100 through the bypass pipe 43. In this manner, overheating of the heating pipe 41 can be prevented.

Figure 7:
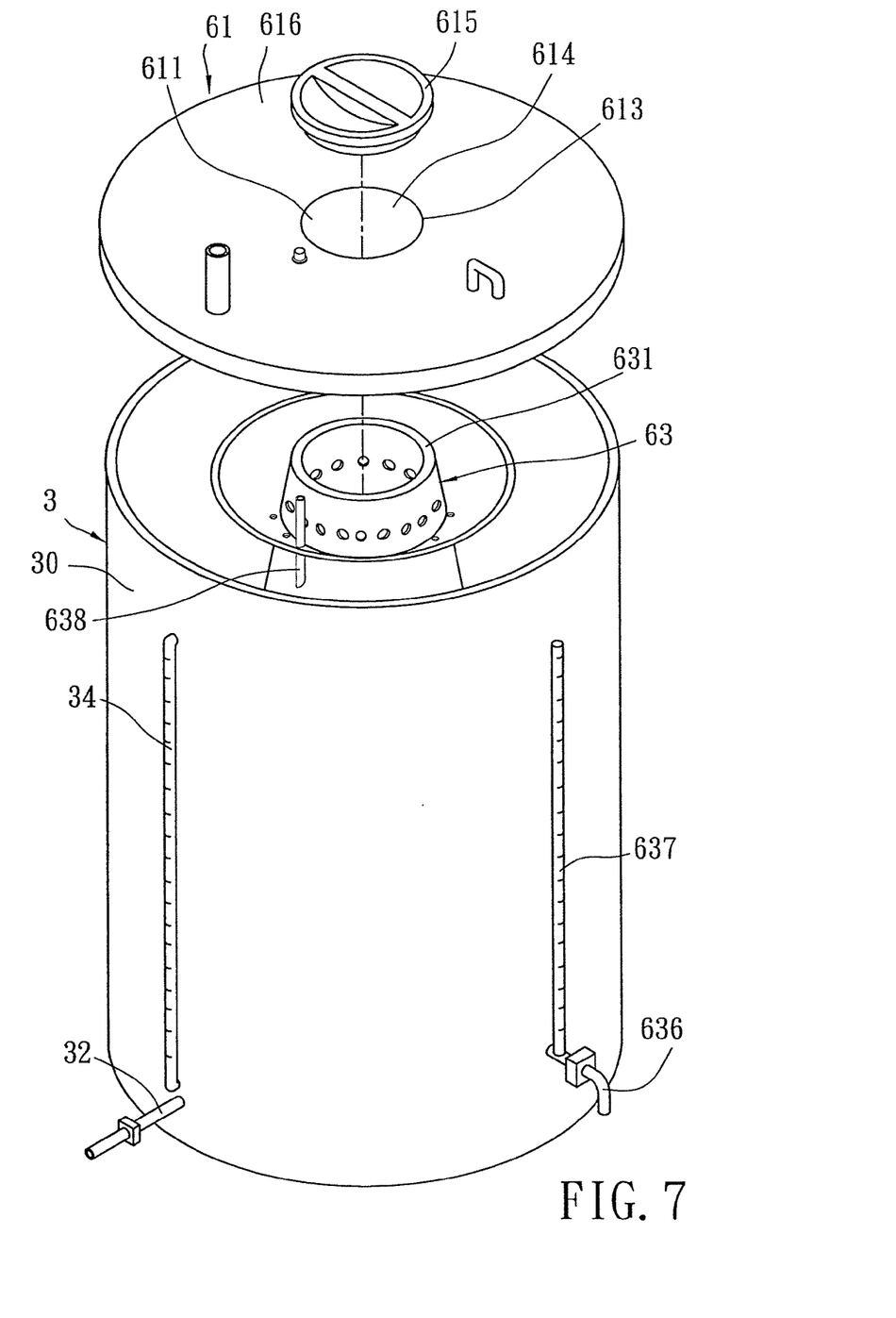
FIG. 7 is a partly exploded perspective view of a raw-water containing mechanism and a heating case of the third preferred embodiment of a vehicle exhaust waste heat utilizing system according to this invention.
Figure 8:
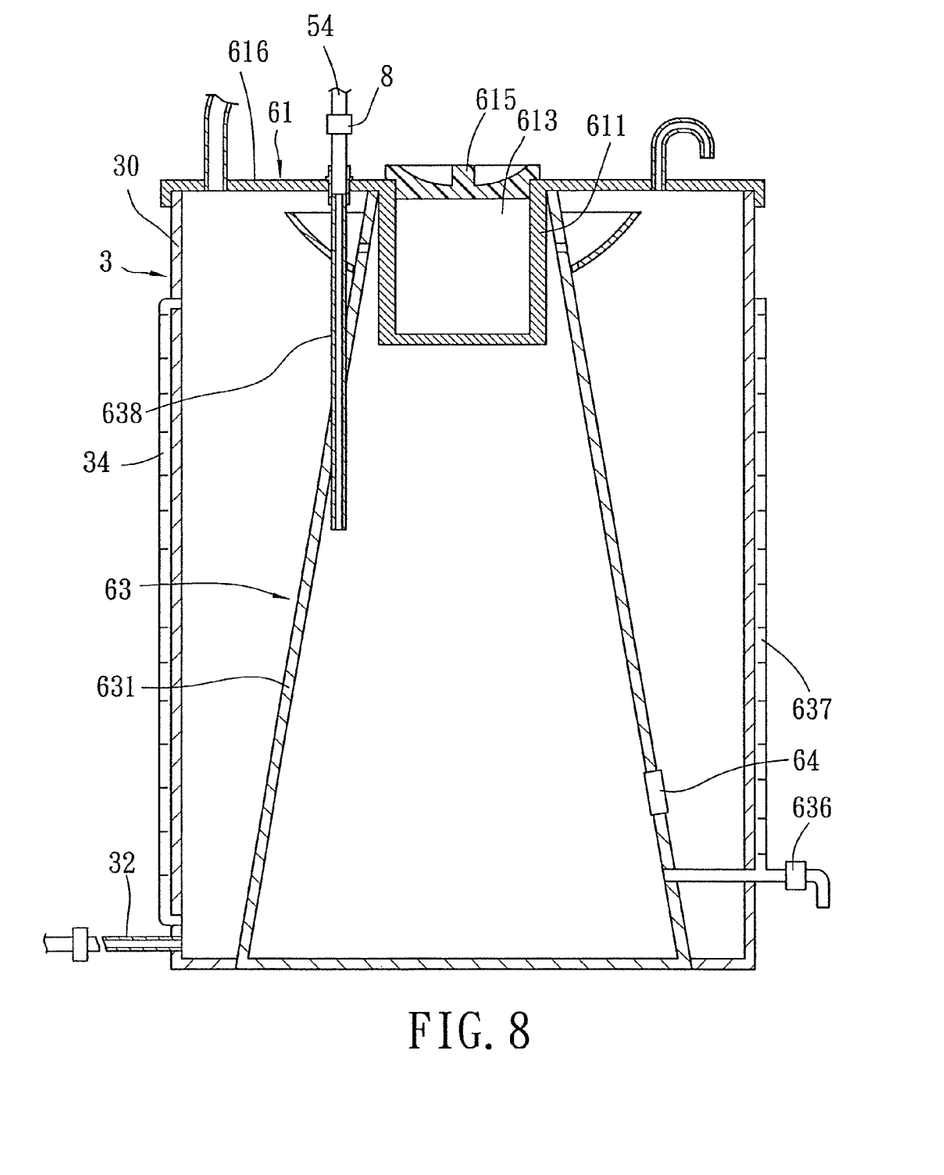
FIG. 8 is a sectional side view of the raw-water containing mechanism and the heating case of the third preferred embodiment.

FIGS. 7 and 8 show the third preferred embodiment of a vehicle exhaust waste heat utilizing system according to this invention, which is similar in construction to the first preferred embodiment. The differences are described in the following.

In this embodiment, the main box body 631 and the raw water box 30 are open upwardly. The main box body 631 is disposed within the raw water box 30, such that the main box body 631 is surrounded by the raw water box 30. The main box body 631 is frustoconical, and has an outer diameter that is increased gradually in a downward direction. A communicating pipe 636 extends into the main box body 631 and through the heating case 61, and is in fluid connection with the second boiled-water pipe 54. The boiled-water passable one-way valve 64 is mounted to a surrounding wall of the main box body 631, and is in fluid communication with the main box body 631 and the raw water box 30.

The heating case 61 further includes an annular cap 616 plugged into an upper end opening in an assembly of the main box body 631 and the raw water box 30. The case body 611 is connected integrally to an inner periphery of the cap 616, and is located within an upper end of the main box body 631. The cover body 615 is two-stepped, and is plugged into an upper end of the case body 611 for covering the same. The communicating pipe 638 extends through the cap 616.

As such, since the main box body 631 is disposed within the raw water box 30, heat generated in the main box body 631 cannot be transmitted out of the raw water box 30, thereby preventing excessive high temperature of the storage compartment area 102.

Since the case body 611 is disposed in the upper end of the main box body 631, the heat produced from the high-temperature boiled water in the main box body 631 can be utilized to increase the temperature in the case body 611. Consequently, heating and temperature conservation of the food in the case body 611 can be performed without providing the water conduit 62 (see FIG. 1) and the heating valve 58 (see FIG. 1). Furthermore, the heating case 61 can be easily removed to allow for exposure of the upper end opening of the assembly of the main box body 631 and the raw water box 30 for cleaning.

In view of the above, due to the presence of the heating pipe mechanism 4, the boiled-water conveying mechanism 5, and the boiled-water processing mechanism 6, a portion of waste heat produced from the catalytic converter 101 can be utilized to boil raw water to thereby form potable water. Hence, during movement of the vehicle, by opening the first and second water faucets 55, 57, the driver or the passengers can conveniently get boiled water, which can save money and exclude a need to prepare bottles for containing potable water. Thus, the system of this invention is suitable for continental countries.

With this invention thus explained, it is apparent that numerous modifications and variations can be made without departing from the scope and spirit of this invention. It is therefore intended that this invention be limited only as indicated by the appended claims.

I claim:

1. An exhaust waste heat utilizing system for a vehicle, the vehicle including a vehicle body, and an exhausting device mounted on the vehicle body, the exhaust waste heat utilizing system comprising:
    a raw-water containing mechanism adapted to be mounted on the vehicle body and adapted to contain raw water;
    a heating pipe mechanism in fluid connection with said raw-water containing mechanism and adapted to be mounted on the exhausting device, said heating pipe mechanism having a heating compartment in fluid communication with said raw-water containing mechanism such that said raw-water containing mechanism supplies the raw water into said heating compartment, said heating compartment being adapted to be heated by the exhausting device to boil the raw water to thereby form boiled water;
    a boiled-water conveying mechanism in fluid connection with said heating pipe mechanism for receiving and conveying the boiled water flowing from said heating pipe mechanism; and
    a boiled-water processing mechanism adapted to be mounted on the vehicle body and including a boiled-water storing box in fluid connection with said boiled-water conveying mechanism for receiving and storing the boiled water flowing from said boiled-water conveying mechanism, and a boiled-water passable one-way valve connected between and in fluid communication with said boiled-water storing box and said raw-water containing mechanism for limiting flow of the boiled from said boiled-water storing box into said raw-water containing mechanism;
    wherein said boil-water conveying mechanism includes a first boiled-water pipe in fluid communication with said heating compartment for conveying the boiled water flowing from said heating compartment, and a second boiled-water pipe disposed between and in fluid connection with said boiled-water storing box and said heating compartment for conveying the boiled water flowing from said heating compartment, said first and second boiled-water pipes having outlet ends that are not connected together by any element.

2. The exhaust waste heat utilizing system as claimed in claim 1, wherein, said boiled-water processing mechanism includes a water conduit disposed between said first boiled-water pipe and said boiled-water storing box for guiding the boiled water to flow into said boiled-water storing box.

3. The exhaust waste heat utilizing system as claimed in claim 2, wherein said boiled-water processing mechanism further includes a heating case disposed between said first boiled-water pipe and said water conduit, said heating case having a heating space that is disposed between and in fluid communication with said first boiled-water pipe and said water conduit and that permits high-temperature boiled water to flow from said first boiled-water pipe thereinto, and a temperature conservation space spaced apart from said heating space and heated by heat energy of the high-temperature boiled water in said heating space, said temperature conservation space having an opening allowing an article to be placed into said temperature conservation space through said opening for heating, said water conduit guiding the boiled water from said heating space into said boiled-water storing box, said boiled-water conveying mechanism further including a heating valve mounted to said first boiled-water pipe and operable to allow the boiled water to flow from said first boiled-water pipe into said hating space.

4. The exhaust waste heat utilizing system as claimed in claim 2, wherein said boiled-water conveying mechanism further includes a first water faucet in fluid connection with said first boiled-water pipe and operable to allow for flow of the boiled water out of said first boiled-water pipe therethrough.

5. The exhaust waste heat utilizing system as claimed in claim 2, wherein said boiled-water storing box has a main box body connected between and in fluid communication with said water conduit and said second boiled-water pipe, and a pressure relief valve connected to said main box body for releasing pressure from said main box body when the pressure in said main box body reaches a predetermined pressure value, said boiled-water passable one-way valve being mounted between said main box body and said raw-water containing mechanism, said pressure relief valve having a pressure relief end allowing steam to flow out of said main box body therethrough, said boiled-water storing box further including a condensing pipe for condensing the steam flowing from said main box body to form water, and a water-collecting box body in fluid connection with said condensing pipe for collecting the water from said condensing pipe.

6. The exhaust waste heat utilizing system as claimed in claim 1, wherein said boiled-water storing box further has a switch operable to allow the boiled water to flow out of said boiled-water storing box, said exhaust waste heat utilizing system further comprising a removable boiled-water containing box connected removably to and in fluid communication with said switch for receiving the boiled water flowing out of said switch.

7. The exhaust waste heat utilizing system as claimed in claim 2, further comprising a thermoelectric chip module mounted on an outer surface of said second boiled-water pipe and heated by the high-temperature boiled water flowing through said second boiled-water pipe to generate electricity.

8. The exhaust waste heat utilizing system as claimed in claim 2, wherein said boiled-water conveying mechanism further includes a passenger-accessible water barrel in fluid connection with said second boiled-water pipe for receiving the boiled water flowing from said second boiled-water pipe, and a second water faucet in fluid connection with said passenger-accessible water barrel and operable to allow for flow of the boiled water out of said passenger-accessible water barrel therethrough.

9. The exhaust waste heat utilizing system as claimed in claim 1, wherein said raw-water containing mechanism includes a raw water box for receiving raw water, a water supply pipe connected between and in fluid communication with said raw water box and said heating pipe mechanism for conveying raw water from said raw water box into said heating compartment, and a raw-water passable one-way valve mounted on said water supply pipe for limiting flow of raw water from said raw water box into said heating compartment.

10. The exhaust waste heat utilizing system as claimed in claim 9, wherein said raw-water containing mechanism further includes a water-supplementing pipe in fluid connection with said raw water box for supplementing raw water into said raw water box, and a water-level indicator in fluid connection said raw water box for indicating water level of raw water in said raw water box, said water-supplementing pipe having a water-supplementing port adapted to be formed in an outer surface of the vehicle body.

11. The exhaust waste heat utilizing system as claimed in claim 9, further comprising a catalytic converter and an exhaust pipe, wherein said heating pipe mechanism has two ends adapted to be in fluid connection with the catalytic converter and the exhaust pipe, respectively, and an exhaust passage adapted for conveying waste exhaust gases produced from the catalytic converter, said heating compartment being spaced apart from and disposed around said exhaust passage.

12. The exhaust waste heat utilizing system as claimed in claim 9, further comprising a catalytic converter and an exhaust pipe, wherein said heating pipe mechanism has:

a heating pipe having two ends adapted to be in fluid connection with the catalytic converter and an exhaust pipe, respectively, said heating compartment being formed in said heating pipe;

a bypass pipe having two ends in fluid connection with the two ends of said heating pipe to bypass said heating compartment; and a control valve adapted to be disposed among the catalytic converter, said heating pipe, and said bypass pipe and operable to convert between a first valve position, where exhaust gases is limited to flow from the catalytic converter into the exhaust pipe through said heating pipe, and a second valve position, where exhaust gases is limited to flow from the catalytic converter into the exhaust pipe through said bypass pipe.

13. The exhaust waste heat utilizing system as claimed in claim 1, wherein said raw-water containing mechanism includes said raw-water containing mechanism includes a hollow raw water box adapted for receiving raw water to be processed, said boiled-water storing box being disposed within said raw water box, such that said main box body is surrounded by said raw water box.

14. The exhaust waste heat utilizing system as claimed in claim 13, wherein said boiled-water processing mechanism includes a heating case mounted in a top end of said boiled-water storing box.

15. The exhaust waste heat utilizing system as claimed in claim 14, wherein said boiled-water storing box includes a main box body mounted in said raw water box and in fluid communication with said boiled-water conveying mechanism for receiving and storing the boiled water flowing from said boiled-water conveying mechanism, said main box body being frustoconical, and having an outer diameter that is increased gradually in a downward direction.

* * * * *